W. P. TIGHE.
RESILIENT TIRE.
APPLICATION FILED JULY 25, 1916.

1,222,496.

Patented Apr. 10, 1917.
2 SHEETS—SHEET 1.

Inventor
W. P. Tighe

By
Attorney

W. P. TIGHE.
RESILIENT TIRE.
APPLICATION FILED JULY 25, 1916.

1,222,496.

Patented Apr. 10, 1917.
2 SHEETS—SHEET 2.

Inventor
W. P. Tighe.

By
Attorney

UNITED STATES PATENT OFFICE.

WILLIAM P. TIGHE, OF NEWARK, NEW JERSEY, ASSIGNOR OF SEVENTY ONE-HUNDREDTHS TO (MRS.) ELIZABETH ESTES, OF NEWARK, NEW JERSEY.

RESILIENT TIRE.

1,222,496.

Specification of Letters Patent.

Patented Apr. 10, 1917.

Application filed July 25, 1916. Serial No. 111,202.

*To all whom it may concern:*

Be it known that I, WILLIAM P. TIGHE, a citizen of the United States, residing at Newark, in the county of Essex and State of New Jersey, have invented certain new and useful Improvements in Resilient Tires, of which the following is a specification.

This invention relates to improvements in resilient tires.

The object of the invention is to provide a tire structure which will reduce skidding to a minimum, and one where punctures are impossible.

A further object of the invention is to provide a structure which, when load strain occurs, relative movement takes place between the hub and the rim of the wheel, whereby the strains, stresses and resiliency are effectually distributed, thereby reducing wear and deterioration due to friction.

The invention also comprehends improvements in the details of construction and arrangement of parts which will be hereinafter described and particularly pointed out in the appended claim.

In the accompanying drawing:—

Figure 1:
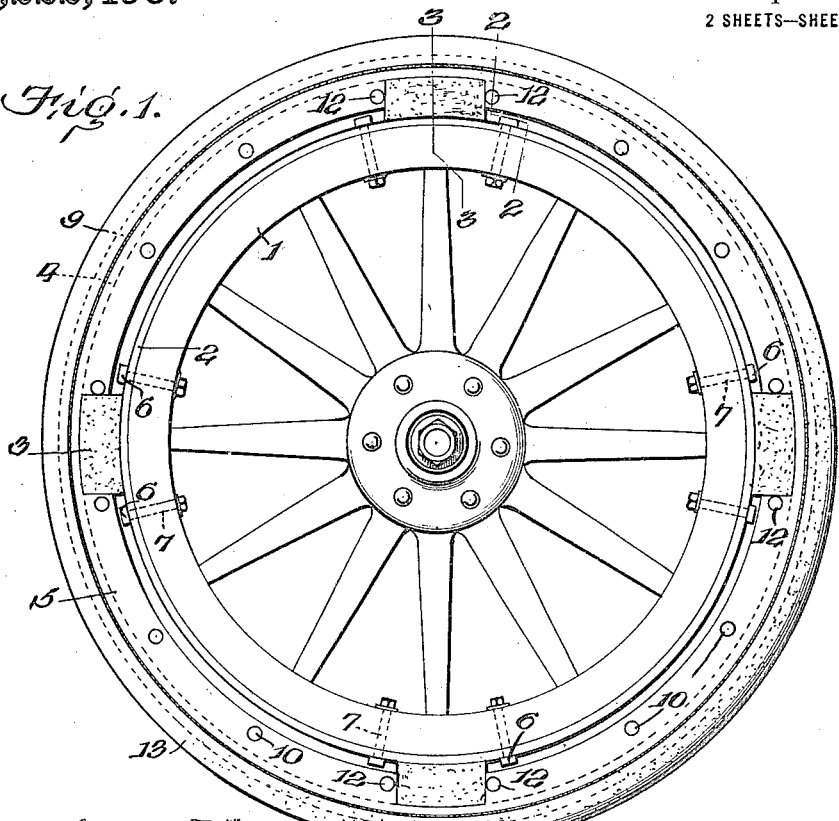
Figure 1 is a side elevation of my improved tire, one of the side retaining plates being shown in dotted lines to better illustrate the construction.

The numeral 1 indicates the felly of a wheel, provided with the usual tire supporting rim 2. Mounted on the rim 2, at suitable intervals, are rubber blocks 3, and supported on these blocks is a band 4, substantially U-shape in cross section. The side flanges 5—5, of the band 4, are oppositely cut away to form pockets 4ª for the rubber blocks 3.

The rubber blocks are driven in between the rim 2, and band 4, the friction between the parts having been found in practice to be sufficient to effectually hold the tire against undue circumferential slipping, although a limited slipping of the blocks is essential when excessive load strains occur, or when an obstruction is encountered, as will be described later on. However, to prevent undue circumferential slipping, should, for any reason, the parts become loose, and to overcome the consequent result which would flow therefrom, I have provided stops 6, on the rim 2, adjacent the opposite ends of each block of rubber. These stops may be variously formed, but for the purpose of illustration I have shown T bolts 7, the threaded stems passing through the felly and are provided with nuts. The elongated heads of the bolts lie near the ends of the blocks so that should the blocks slip, they will abut against the heads and there movement will be arrested.

At this time it may be noted that because of the rubber blocks being confined by the flanges of the band 4, as well as by bolts to be described, the band 4 and blocks 3 form a unit, consequently both elements must move together.

After the rim 2 and blocks 3 are mounted on the felly rim, annular side retaining plates 9 are secured to the flanges 5, by bolts 10. Each plate extends slightly beyond the outer periphery of the band 4, and also extends inwardly beyond the rim 2. The rim 2 forms a guide, and at the same time serves as a means for retaining the tire in position on the wheel. The bolts 10 pass through the plates 9, and the flanges 5, the bolts indicated at 12 being arranged opposite the ends of each block to further assist in holding the blocks in fixed relative position to band 4.

Figure 2:
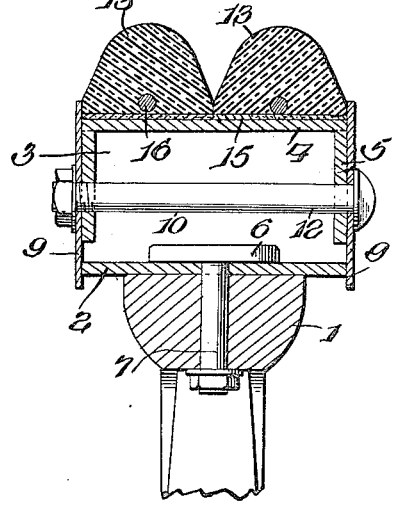
Fig. 2 is a cross section on the line 2—2 of Fig. 1.
Figure 3:
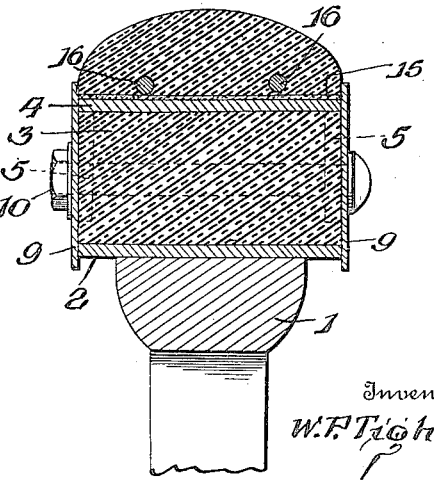
Fig. 3 is a similar view on the line 3—3 of Fig. 1, but illustrating a different shaped tire on the rim.
Figure 4:
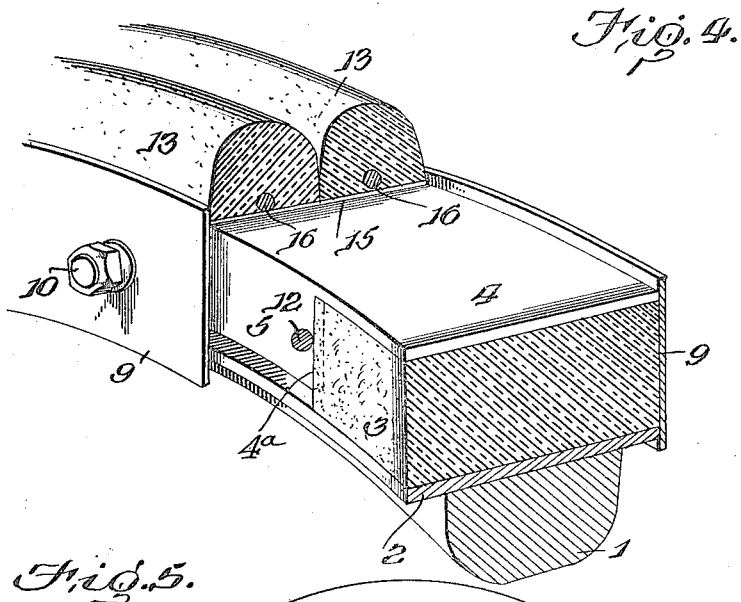
Fig. 4 is a detail perspective section of a portion of the tire.

If the tire is equipped on a wheel designed for use at the rear of the vehicle, two solid rubber tires 13, 13, arranged side by side, as in Fig. 2, will be employed, but for front wheels a single solid rubber tire is used, as indicated in Fig. 3. In either event, each solid rubber tire is provided with a canvas base 15, which is connected to the band 4, and through the tires extend wires 16, such as are usually employed for locking rubber tires to wheels.

Referring to Fig. 2, it will be seen that the side plates 9, confine the rubber tires, and prevent the same from moving laterally when the tire is in use, lateral displacement of the tire body being prevented by the plates engaging the rim 2.

Figure 5:
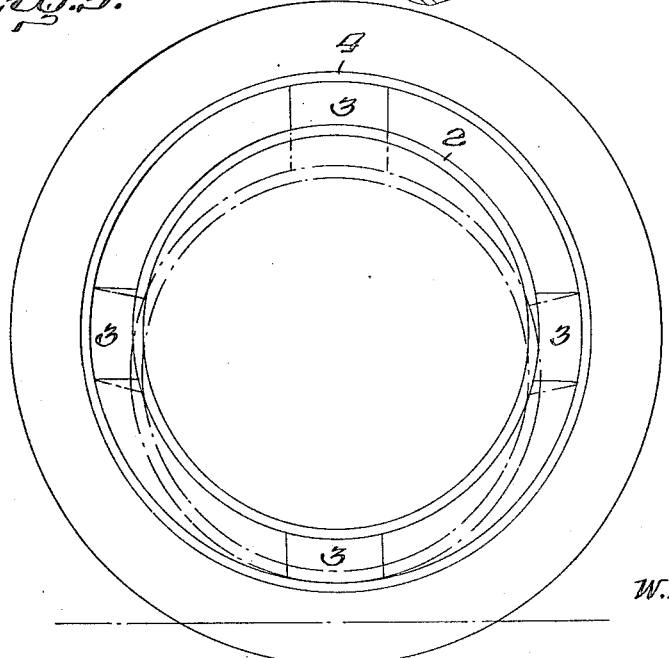
Fig. 5 is a diagrammatic view illustrating the action of the tire.

Assume the parts are in the position shown in Fig. 1, and in the full line position shown in Fig. 5. When load strain occurs (referring to Fig. 5) the lowermost block 5 is compressed and distorted between the band 4 and the rim 2, inasmuch as the rim at the bottom has moved toward the bottom of the band. As the rim 2 moves bodily, it follows that the upper portion moves as far away from the upper portion of the band as these two members move toward each other at the bottom. Hence the expansive force of the upper block comes into play, and the upper block, while expanded, is still snugly confined between the rim and band, the resiliency of the blocks each in its own way serving to take up a part of the load strain and the shock incident thereto. The two side blocks (as shown diagrammatically in Fig. 5) tend to both bend and slip. The frictional grip between the rim and band is such that before the blocks move, they bend on the end walls of the pockets 4ᵃ and the screw 12, but if a severe shock occurs, then the blocks will slip circumferentially on the rim 2.

Immediately the load strain is removed, the blocks and the rim assume normal position.

Of course, as many blocks may be used as desired, and if more than shown should be employed, the yielding, compressing, expanding, and distorting of the various individual blocks will in principle be the same as previously described. Also, if the shock should be in advance of the center, between two blocks, the forces would be extended in different directions than described with reference to Fig. 5, although in all cases the same basic principle is involved.

From the foregoing description it is evident I have provided a tire body which, while having all the advantages of the usual pneumatic tire, is not subject to the annoyances incident to punctures or blow-outs. If, perchance, one of the blocks of rubber should disintegrate, or become worn, one of the side plates 9 can be readily removed, and another block driven in place, an operation which in no way requires the knocking down and taking to pieces of the entire body structure.

In recent experiments in wet weather, and a long run over very rough roads, in an automobile having the rear wheels equipped with tires such as shown in Fig. 2, it was found that the riding was much easier than with the ordinary pneumatic tire, and that it was practically impossible to make the car skid. The easy riding was undoubtedly due to the fact that the construction distributed the shock throughout the whole tire body. The non-skidding was undoubtedly due to the fact that the two solid rubber treads spread in all directions, particularly laterally, and above all, the whole tire body was allowed a limited circumferential movement, which, at the intervals of resistance between traction and tendency to skid, the rubber blocks immediately pulled the parts back to normal position. All these varying forces working together serve to hold the wheel to the surface, with the result as stated, i. e. skidding is impossible.

What I claim is:—

The combination of a wheel rim, a band substantially U-shape in cross section having its side flanges spaced from and located around the rim, the flanges having opposite cut away portions, spaced blocks of rubber interposed between the rim and band and confined by the walls of the cut away portions, and the ends of said blocks being flush with the sides of the band, the blocks being frictionally confined against normal movement between the band and rim but capable of yielding circumferentially and subsequently slipping to a limited degree on the rim under undue load strain, side plates bolted to the sides of the flanges and overlapping the sides of the rim, bolts extending through the side plates and the flanges to hold the tire on the rim, certain of said bolts being located adjacent the opposite ends of each block to brace the latter, and means on the rim spaced from the ends of the blocks to limit the slipping movement of the blocks on said rim.

In testimony whereof I affix my signature in the presence of two witnesses.

WILLIAM P. TIGHE.

Witnesses:
 FREDERICK FUCHS,
 RICHARD F. HOPWOOD.

Copies of this patent may be obtained for five cents each, by addressing the "Commissioner of Patents, Washington, D. C."